United States Patent
Grichnik et al.

(10) Patent No.: US 8,364,610 B2
(45) Date of Patent: Jan. 29, 2013

(54) PROCESS MODELING AND OPTIMIZATION METHOD AND SYSTEM

(75) Inventors: Anthony J. Grichnik, Peoria, IL (US); Michael Seskin, Cardiff, CA (US)

(73) Assignee: Caterpillar Inc., Peoria, IL (US)

( * ) Notice: Subject to any disclaimer, the term of this patent is extended or adjusted under 35 U.S.C. 154(b) by 1101 days.

(21) Appl. No.: 11/882,189

(22) Filed: Jul. 31, 2007

(65) Prior Publication Data

US 2008/0021681 A1   Jan. 24, 2008

Related U.S. Application Data

(63) Continuation-in-part of application No. 11/101,554, filed on Apr. 8, 2005, now abandoned.

(51) Int. Cl.
G06F 15/18   (2006.01)
G06F 7/60    (2006.01)

(52) U.S. Cl. .............................. 706/12; 703/2
(58) Field of Classification Search ........ 703/2; 706/13, 706/19–20, 12
See application file for complete search history.

(56) References Cited

U.S. PATENT DOCUMENTS

| | | | |
|---|---|---|---|
| 3,316,395 | A | 4/1967 | Lavin |
| 4,136,329 | A | 1/1979 | Trobert |
| 4,533,900 | A | 8/1985 | Muhlberger et al. |
| 5,014,220 | A | 5/1991 | McMann et al. |
| 5,163,412 | A | 11/1992 | Neu et al. |
| 5,262,941 | A | 11/1993 | Saladin et al. |
| 5,341,315 | A | 8/1994 | Niwa et al. |
| 5,386,373 | A | 1/1995 | Keeler et al. |
| 5,434,796 | A | 7/1995 | Weininger |
| 5,539,638 | A | 7/1996 | Keeler et al. |
| 5,548,528 | A | 8/1996 | Keeler et al. |
| 5,561,610 | A | 10/1996 | Schricker et al. |
| 5,566,091 | A | 10/1996 | Schricker et al. |
| 5,585,553 | A | 12/1996 | Schricker |
| 5,594,637 | A | 1/1997 | Eisenberg et al. |
| 5,598,076 | A | 1/1997 | Neubauer et al. |

(Continued)

FOREIGN PATENT DOCUMENTS

| EP | 1103926 | 5/2001 |
|---|---|---|
| EP | 1367248 | 12/2003 |

(Continued)

OTHER PUBLICATIONS

Gletos et al. "A Computer-Aided Diagnostic System to Characterize CT Focal Liver Lesions: Design and Optimization of a Neural Network Classifier", Sep. 2003, IEEE Transactions on Information Technology in Biomedicine, vol. 7, No. 3, pp. 153-162.*

(Continued)

*Primary Examiner* — Suzanne Lo
(74) *Attorney, Agent, or Firm* — Finnegan, Henderson, Farabow, Garrett & Dunner LLP

(57) ABSTRACT

A method is provided for model optimization. The method may include obtaining respective distribution descriptions of a plurality of input parameters to a model indicative of interrelationships between the input parameters and one or more output parameters. The method may also include specifying respective search ranges for the plurality of input parameters and simulating the model to determine a desired set of input parameters based on a zeta statistic of the model. Further, the method may include determining respective desired distributions of the input parameters based on the desired set of input parameters; determining significance levels of the input parameters in interacting with the output parameter based on the simulation and the desired distributions of the input parameters; and presenting the significance levels.

17 Claims, 5 Drawing Sheets

U.S. PATENT DOCUMENTS

| | | | |
|---|---|---|---|
| 5,604,306 | A | 2/1997 | Schricker |
| 5,604,895 | A | 2/1997 | Raimi |
| 5,608,865 | A | 3/1997 | Midgely et al. |
| 5,666,297 | A | 9/1997 | Britt et al. |
| 5,682,317 | A | 10/1997 | Keeler et al. |
| 5,698,780 | A | 12/1997 | Mizutani et al. |
| 5,727,128 | A | 3/1998 | Morrison |
| 5,750,887 | A | 5/1998 | Schricker |
| 5,752,007 | A | 5/1998 | Morrison |
| 5,835,902 | A | 11/1998 | Jannarone |
| 5,842,202 | A | 11/1998 | Kon |
| 5,914,890 | A | 6/1999 | Sarangapani et al. |
| 5,925,089 | A | 7/1999 | Fujime |
| 5,950,147 | A | 9/1999 | Sarangapani et al. |
| 5,966,312 | A | 10/1999 | Chen |
| 5,987,976 | A | 11/1999 | Sarangapani |
| 6,086,617 | A | 7/2000 | Waldon et al. |
| 6,092,016 | A | 7/2000 | Sarangapani et al. |
| 6,119,074 | A | 9/2000 | Sarangapani |
| 6,145,066 | A | 11/2000 | Atkin |
| 6,195,648 | B1 | 2/2001 | Simon et al. |
| 6,199,007 | B1 | 3/2001 | Zavarehi et al. |
| 6,208,982 | B1 | 3/2001 | Allen, Jr. et al. |
| 6,223,133 | B1 | 4/2001 | Brown |
| 6,236,908 | B1 | 5/2001 | Cheng et al. |
| 6,240,343 | B1 | 5/2001 | Sarangapani et al. |
| 6,269,351 | B1 | 7/2001 | Black |
| 6,298,718 | B1 | 10/2001 | Wang |
| 6,370,544 | B1 | 4/2002 | Krebs et al. |
| 6,405,122 | B1 | 6/2002 | Yamaguchi |
| 6,438,430 | B1 | 8/2002 | Martin et al. |
| 6,442,511 | B1 | 8/2002 | Sarangapani et al. |
| 6,477,660 | B1 | 11/2002 | Sohner |
| 6,513,018 | B1 | 1/2003 | Culhane |
| 6,546,379 | B1 | 4/2003 | Hong et al. |
| 6,584,768 | B1 | 7/2003 | Hecker et al. |
| 6,594,989 | B1 | 7/2003 | Hepburn et al. |
| 6,698,203 | B2 | 3/2004 | Wang |
| 6,711,676 | B1 | 3/2004 | Zomaya et al. |
| 6,721,606 | B1 | 4/2004 | Kaji et al. |
| 6,725,208 | B1 | 4/2004 | Hartman et al. |
| 6,763,708 | B2 | 7/2004 | Ting et al. |
| 6,775,647 | B1 | 8/2004 | Evans et al. |
| 6,785,604 | B2 | 8/2004 | Jacobson |
| 6,810,442 | B1 | 10/2004 | Lin et al. |
| 6,823,675 | B2 | 11/2004 | Brunell et al. |
| 6,859,770 | B2 | 2/2005 | Ramsey |
| 6,859,785 | B2 | 2/2005 | Case |
| 6,865,883 | B2 | 3/2005 | Gomulka |
| 6,882,929 | B2 | 4/2005 | Liang et al. |
| 6,895,286 | B2 | 5/2005 | Kaji et al. |
| 6,935,313 | B2 | 8/2005 | Jacobson |
| 6,941,287 | B1 | 9/2005 | Vaidyanathan et al. |
| 6,952,662 | B2 | 10/2005 | Wegerich et al. |
| 6,976,062 | B1 | 12/2005 | Denby et al. |
| 7,000,229 | B2 | 2/2006 | Gere |
| 7,024,343 | B2 | 4/2006 | El-Ratal |
| 7,027,953 | B2 | 4/2006 | Klein |
| 7,035,834 | B2 | 4/2006 | Jacobson |
| 7,117,079 | B2 | 10/2006 | Streichsbier et al. |
| 7,124,047 | B2 | 10/2006 | Zhang et al. |
| 7,127,892 | B2 | 10/2006 | Akins et al. |
| 7,174,284 | B2 | 2/2007 | Dolansky et al. |
| 7,178,328 | B2 | 2/2007 | Solbrig |
| 7,191,161 | B1 | 3/2007 | Rai et al. |
| 7,194,392 | B2 | 3/2007 | Tuken et al. |
| 7,213,007 | B2 | 5/2007 | Grichnik |
| 7,356,393 | B1 | 4/2008 | Schlatre et al. |
| 7,369,925 | B2 | 5/2008 | Morioka et al. |
| 2002/0014294 | A1 | 2/2002 | Okano et al. |
| 2002/0016701 | A1 | 2/2002 | Duret et al. |
| 2002/0042784 | A1 | 4/2002 | Kerven et al. |
| 2002/0049704 | A1 | 4/2002 | Vanderveldt et al. |
| 2002/0103996 | A1 | 8/2002 | LeVasseur et al. |
| 2002/0198821 | A1 | 12/2002 | Munoz |
| 2003/0018503 | A1 | 1/2003 | Shulman |
| 2003/0055607 | A1 | 3/2003 | Wegerich et al. |
| 2003/0093250 | A1 | 5/2003 | Goebel |
| 2003/0126053 | A1 | 7/2003 | Boswell et al. |
| 2003/0126103 | A1 | 7/2003 | Chen et al. |
| 2003/0130855 | A1 | 7/2003 | Babu et al. |
| 2003/0167354 | A1 | 9/2003 | Peppers et al. |
| 2003/0187567 | A1 | 10/2003 | Sulatisky et al. |
| 2003/0187584 | A1 | 10/2003 | Harris |
| 2003/0200296 | A1 | 10/2003 | Lindsey |
| 2004/0030420 | A1 | 2/2004 | Ulyanov et al. |
| 2004/0034857 | A1 | 2/2004 | Mangino et al. |
| 2004/0059518 | A1 | 3/2004 | Rothschild |
| 2004/0077966 | A1 | 4/2004 | Yamaguchi et al. |
| 2004/0122702 | A1 | 6/2004 | Sabol et al. |
| 2004/0122703 | A1 | 6/2004 | Walker et al. |
| 2004/0128058 | A1 | 7/2004 | Andres et al. |
| 2004/0135677 | A1 | 7/2004 | Asam |
| 2004/0138995 | A1 | 7/2004 | Hershkowitz et al. |
| 2004/0153227 | A1 | 8/2004 | Hagiwara et al. |
| 2004/0215430 | A1* | 10/2004 | Huddleston et al. ............ 703/2 |
| 2004/0230404 | A1 | 11/2004 | Messmer et al. |
| 2004/0267818 | A1 | 12/2004 | Hartenstine |
| 2005/0047661 | A1 | 3/2005 | Mauer |
| 2005/0055176 | A1 | 3/2005 | Clarke et al. |
| 2005/0091093 | A1 | 4/2005 | Bhaskaran et al. |
| 2005/0209943 | A1 | 9/2005 | Ballow et al. |
| 2005/0210337 | A1 | 9/2005 | Chester et al. |
| 2005/0240539 | A1 | 10/2005 | Olavson |
| 2005/0261791 | A1 | 11/2005 | Chen et al. |
| 2005/0262031 | A1 | 11/2005 | Saidi et al. |
| 2005/0278227 | A1 | 12/2005 | Esary et al. |
| 2005/0278432 | A1 | 12/2005 | Feinleib et al. |
| 2006/0010057 | A1 | 1/2006 | Bradway et al. |
| 2006/0010142 | A1 | 1/2006 | Kim et al. |
| 2006/0010157 | A1 | 1/2006 | Dumitrascu et al. |
| 2006/0025897 | A1 | 2/2006 | Shostak et al. |
| 2006/0026270 | A1 | 2/2006 | Sadovsky et al. |
| 2006/0026587 | A1 | 2/2006 | Lemarroy et al. |
| 2006/0064474 | A1 | 3/2006 | Feinleib et al. |
| 2006/0068973 | A1 | 3/2006 | Kappauf et al. |
| 2006/0129289 | A1 | 6/2006 | Kumar et al. |
| 2006/0130052 | A1 | 6/2006 | Allen et al. |
| 2006/0229753 | A1 | 10/2006 | Seskin et al. |
| 2006/0229769 | A1 | 10/2006 | Grichnik et al. |
| 2006/0229852 | A1 | 10/2006 | Grichnik et al. |
| 2006/0229854 | A1 | 10/2006 | Grichnik et al. |
| 2006/0230018 | A1 | 10/2006 | Grichnik et al. |
| 2006/0230097 | A1 | 10/2006 | Grichnik et al. |
| 2006/0230313 | A1 | 10/2006 | Grichnik et al. |
| 2006/0241923 | A1 | 10/2006 | Xu et al. |
| 2006/0247798 | A1 | 11/2006 | Subbu et al. |
| 2007/0061144 | A1 | 3/2007 | Grichnik et al. |
| 2007/0094048 | A1 | 4/2007 | Grichnik |
| 2007/0094181 | A1 | 4/2007 | Tayebnejad et al. |
| 2007/0118338 | A1 | 5/2007 | Grichnik et al. |
| 2007/0124237 | A1 | 5/2007 | Sundararajan et al. |
| 2007/0150332 | A1 | 6/2007 | Grichnik et al. |
| 2007/0168494 | A1 | 7/2007 | Liu et al. |
| 2007/0179769 | A1 | 8/2007 | Grichnik et al. |
| 2007/0203864 | A1 | 8/2007 | Grichnik |
| 2008/0154811 | A1 | 6/2008 | Grichnik et al. |

FOREIGN PATENT DOCUMENTS

| | | |
|---|---|---|
| EP | 1418481 | 5/2004 |
| JP | 10-332621 | 12/1998 |
| JP | 11-351045 | 12/1999 |
| JP | 2002-276344 | 9/2002 |
| WO | WO97/42581 | 11/1997 |
| WO | WO02/057856 | 7/2002 |
| WO | WO2006/017453 | 2/2006 |
| WO | 2006110242 | 10/2006 |

OTHER PUBLICATIONS

Diepen et al. "Evaluating chi-squared automatic interaction detection" 2006, Information systems No. 31, pp. 814-831.*
"CHAID and Exhaustive CHAID Algorithms" Jul. 2004, 8 pages.*
Liu et al. "Specification Tests in the Efficient Method of Moments Framework with Application to the Stochastic Volatility Models", Sep. 1998, 31 pages.*
SPSS, Inc. "AnswerTree 2.0 User's Guide" 1998, 203 pages.*

Fowdar, Crockett, Bandar, and O'Shea, "On the Use of Fuzzy Trees for Solving Classificaton Problems with Numeric Outcomes," Fuzzy Systems, 2005, pp. 436-441, The 14th IEEE International Conference on Reno, Nevada, USA May 22-25, 2005, Piscataway, USA.

Wilkinson Leland, "Tree Structured Data Analysis: AID, CHAID and CART," Jan. 1, 1992, pp. 1-10, XP 002265278, Chicago, USA.

Galperin, G. et al, "Parallel Monte-Carlo Simulation of Neural Network Controllers," available at http://wwwfp.mcs.anl.gov/ccst/research/reports_pre1998/neural_network/galperin.html. (6 pages).

Allen et al., "Supersaturated Designs That Maximize the Probability of Identifying Active Factors," 2003 American Statistical Association and the American Society for Quality, Technometrics, vol. 45, No. 1, Feb. 2003, pp. 1-8.

April, Jay et al., "Practical Introduction to Simulation Optimization," Proceedings of the 2003 Winter Simulation Conference, pp. 71-78.

Bandte et al., "Viable Designs Through a Joint Probabilistic Estimation Technique," SAE International, and the American Institute of Aeronautics and Astronautics, Inc., Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," Geoscience and Remote Sensing Symposium, 2004, Proceedings, 2004 IEEE International Anchorage, AK, Sep. 20-24, 2004, vol. 6, Sep. 20, 2004, pp. 4139-4142.

Berke et al., "Optimum Design of Aerospace Structural Components Using Neural Networks," Computers and Structures, vol. 48, No. 6, Sep. 17, 1993, pp. 1001-1010.

Bezdek, "Genetic Algorithm Guided Clustering," IEEE 0-7803-1899-4/94, 1994, pp. 34-39.

Brahma et al., "Optimization of Diesel Engine Operating Parameters Using Neural Networks," SAE Technical Paper Series, 2003-01-3228, Oct. 27-30, 2003 (11 pages).

Chau et al., "Use of runs test to access cardiovascular autonomic function in diabetic subjects," Abstract, Diabetes Care, vol. 17, Issue 2, pp. 146-148, available at http://care.diabetesjournals.org/cgi/content/abstract/17/2/146).

Chung et al., "Process Optimal Design in Forging by Genetic Algorithm," Journal of Manufacturing Science and Engineering, vol. 124, May 2002, pp. 397-408.

Cox et al., "Statistical Modeling for Efficient Parametric Yield Estimation of MOS VLSI Circuits," IEEE, 1983, pp. 242-245.

De Maesschalck et al., "The Mahalanobis Distance," Chemometrics and Intelligent Laboratory Systems, vol. 50, No. 1, Jan. 2000, pp. 1-18.

Dikmen et al., "Estimating Distributions in Genetic Algorithms," ISCIS 2003, LNCS 2869, 2003, pp. 521-528.

Gletsos et al., "A Computer-Aided Diagnostic System to Characterize CT Focal Liver Lesions: Design and Optimization of a Neural Network Classifier," IEEE Transactions on Information Technology in Biomedicine, vol. 7, No. 3, Sep. 2003 pp. 153-162.

Grichnik et al., "An Improved Metric for Robust Engineering," Proceedings of the 2007 International Conference on Scientific Computing, Las Vegas, NV (4 pages).

Grichnik et al., Copending U.S. Appl. No. 11/529,267, filed Sep. 29, 2006, entitled Virtual Sensor Based Engine Control System and Method.

Grichnik et al., Copending U.S. Appl. No. 11/730,363, filed Mar. 30, 2007, entitled Prediction Based Engine Control System and Method.

Grichnik et al., Copending U.S. Appl. No. 11/812,164, filed Jun. 15, 2007, entitled Virtual Sensor System and Method.

Grichnik et al., Copending U.S. Appl. No. 11/979,408, filed Nov. 2, 2007, entitled Virtual Sensor Network (VSN) System and Method.

Holland, John H., "Genetic Algorithms," Scientific American, Jul. 1992, pp. 66-72.

Hughes et al., "Linear Statistics for Zeros of Riemann's Zeta Function," C.R. Acad. Sci. Paris, Ser. I335 (2002), pp. 667-670.

Ko et al., "Application of Artificial Neural Network and Taguchi Method to Perform Design in Metal Forming Considering Workability," International Journal of Machine Tools & Manufacture, vol. 39, No. 5, May 1999, pp. 771-785.

Kroha et al., "Object Server on a Parallel Computer," 1997 IEEE 0-8186-8147-0/97, pp. 284-288.

Mavris et al., "A Probabilistic Approach to Multivariate Constrained Robust Design Simulation," Society of Automotive Engineers, Inc., Paper No. 975508, 1997, pp. 1-11.

National Institute of Health, "10-year CVD Risk Calculator" available at http://hin.nhlbi.nih.gov/atpiii/calculator.asp?usertype=prof, printed Aug. 2, 2005, 2 pages.

Obayashi et al, "Multiobjective Evolutionary Computation for Supersonic Wing-Shape Optimization," IEEE Transactions on Evolutionary Computation, vol. 4, No. 2, Jul. 2000, pp. 182-187.

Simpson et al., "Metamodels for Computer-Based Engineering Design: Survey & Recommendations," Engineering with Computers, 2001, vol. 17, pp. 129-150.

Solar Turbines, "InSight System," Oct. 19, 2006, http://mysolar.cat.com.

Solar Turbines, "InSight Systems, Machinery Management Solutions," Oct. 19, 2006.

Song et al., "The Hyperellipsoidal Clustering Using Genetic Algorithm," 1997 IEEE International Conference on Intelligent Processing Systems, Oct. 28-31, 1997, Beijing, China, pp. 592-596.

Sytsma, Sid, "Quality and Statistical Process Control," available at http://www.sytsma.com/tqmtools/ctlchtprinciples.html, printed Apr. 7, 2005, 6 pages.

Taguchi et al., "The Mahalanobis-Taguchi Strategy," A Pattern Technology System, John Wiley & Sons, Inc., 2002, 234 pages.

Taylor et al., "Guidelines for Evaluating and Expressing the Uncertainty of NIST Measurement Results," NIST Technical Note 1297, 1994 Edition, United States Dept. of Commerce, National Institute of Standards and Technology (25 pages).

Thompson, G.J. et al., "Neural Network Modelling of the Emissions and Performance of a Heavy-Duty Diesel Engine," Proc. Instu. Mech. Engrs., vol. 214, Part D (2000), pp. 111-126.

Traver, Michael L. et al., "Neural Network-Based Diesel Engine Emissions Prediction Using In-Cylinder Combustion Pressure," International Spring Fuels & Lubricants Meeting & Exposition, SAE Technical Paper Series, May 3-6, 1999, 17 pages.

Woodall, Tsui et al., "A Review and Analysis of the Mahalanobis-Taguchi System," Technometrics, Feb. 2003, vol. 45, No. 1 (15 pages).

Wu et al., "Cam-phasing Optimization Using Artificial Neural Networks as Surrogate Models—Fuel Consumption and Nox Emissions," SAE Technical Paper Series, 2006-01-1512, Apr. 3-6, 2006 (19 pages).

Yang et al., "Similar Cases Retrieval from the Database of Laboratory Test Results," Journal of Medical Systems, vol. 27, No. 3, Jun. 2003, pp. 271-282.

Yuan et al., "Evolutionary Fuzzy C-Means Clustering Algorithm," 1995 IEEE 0-7803-2461-7/95, pp. 2221-2226.

Office Action in U.S. Appl. No. 11/101,554 dated Dec. 24, 2009 (2 pages).

Office Action in U.S. Appl. No. 11/101,554 dated Apr. 21, 2009 (18 pages).

Office Action in U.S. Appl. No. 11/101,554 dated Oct. 7, 2008 (12 pages).

Traver, Michael L. et al., "A Neural Network-Based Virtual NO$_\chi$ Sensor for Diesel Engines," West Virginia University, Mechanical and Aerospace Engineering Dept., Morgantown, WV, 7 pages (Apr. 2000).

\* cited by examiner

PROCESS MODELING AND OPTIMIZATION METHOD AND SYSTEM

CROSS REFERENCE

This application is a continuation-in-part (CIP) application of and claims the priority and benefit of U.S. patent application Ser. No. 11/101,554, filed Apr. 8, 2005 now abandoned.

TECHNICAL FIELD

This disclosure relates generally to computer based mathematical modeling techniques and, more particularly, to methods and systems for identifying desired distribution characteristics of input parameters of mathematical models and interpretation methods thereof.

BACKGROUND

Mathematical models, particularly process models, are often built to capture complex interrelationships between input parameters and outputs. Neural networks may be used in such models to establish correlations between input parameters and outputs. Because input parameters may be statistically distributed, these models may also need to be optimized, for example, to find appropriate input values to produce a desired output. Simulation may often be used to provide such optimization.

When used in optimization processes, conventional simulation techniques, such as Monte Carlo or Latin Hypercube simulations, may produce an expected output distribution from knowledge of the input distributions, distribution characteristics, and representative models. G. Galperin et al., "Parallel Monte-Carlo Simulation of Neural Network Controllers," available at http://www-fp.mcs.anl.gov/ccst/research/reports_pre1998/neural_network/galperin.html, describes a reinforcement learning approach to optimize neural network based models. However, such conventional techniques may be unable to guide the optimization process using interrelationships among input parameters and between input parameters and the outputs. Further, these conventional techniques may be unable to identify opportunities to increase input variation that has little or no impact on output variations. Such conventional techniques may also fail to represent the optimization process and results effectively and efficiently to users of these models.

Methods and systems consistent with certain features of the disclosed systems are directed to solving one or more of the problems set forth above.

SUMMARY OF THE INVENTION

One aspect of the present disclosure includes a method for model optimization. The method may include obtaining respective distribution descriptions of a plurality of input parameters to a model indicative of interrelationships between the input parameters and one or more output parameters. The method may also include specifying respective search ranges for the plurality of input parameters and simulating the model to determine a desired set of input parameters based on a zeta statistic of the model. Further, the method may include determining respective desired distributions of the input parameters based on the desired set of input parameters; determining significance levels of the input parameters in interacting with the output parameter based on the simulation and the desired distributions of the input parameters; and presenting the significance levels.

Another aspect of the present disclosure includes a computer system. The computer system may include a console, at least one input device, and a processor. The processor is configured to obtain respective distribution descriptions of a plurality of input parameters to a model indicative of interrelationships between the input parameters and one or more output parameters and to specify respective search ranges for the plurality of input parameters. The processor is also configured to simulate the model to determine a desired set of input parameters based on a zeta statistic of the model and to determine respective desired distributions of the input parameters based on the desired set of input parameters. Further, the processor is configured to determine significance levels of the input parameters in interacting with the output parameter based on the simulation and the desired distributions of the input parameters and to present the significance levels.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
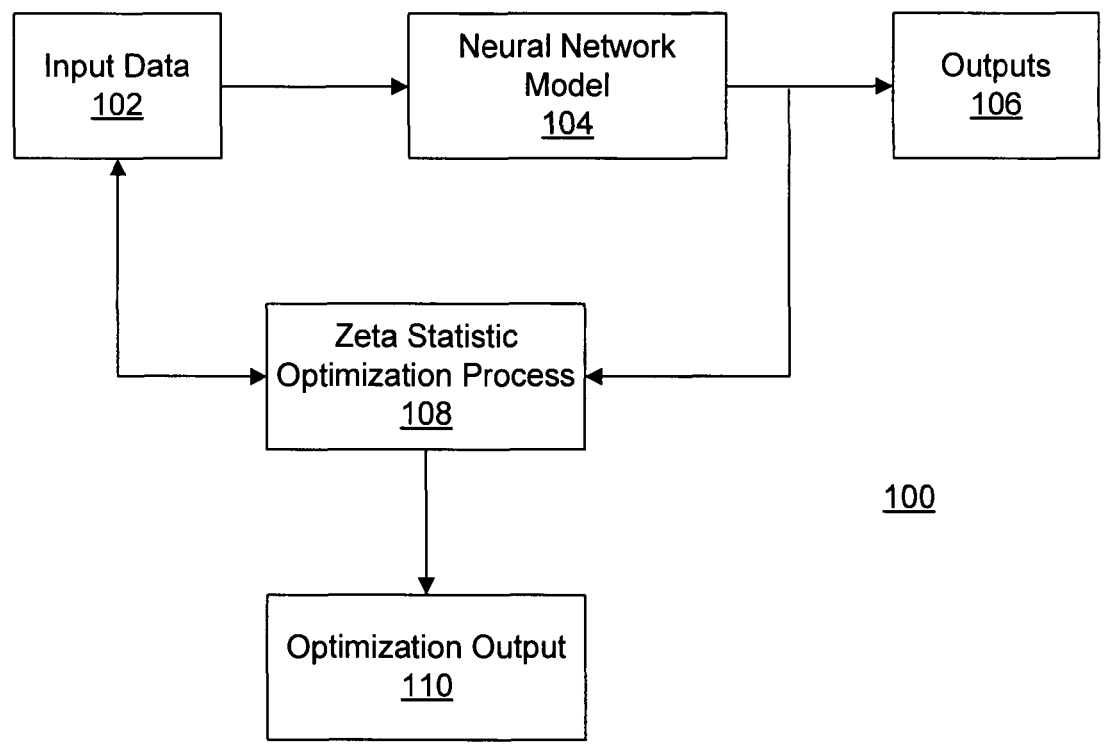
FIG. 1 illustrates a flowchart diagram of an exemplary data analyzing and processing flow consistent with certain disclosed embodiments.

FIG. 1 illustrates a flowchart diagram of an exemplary data analyzing and processing flow 100 using zeta statistic processing and incorporating certain disclosed embodiments. Data analyzing and processing flow 100 may be associated with any appropriate product design, medical application, or financial application. As shown in FIG. 1, input data 102 may be provided to a neural network model 104 to build interrelationships between outputs 106 and input data 102. Input data 102 may include any data records collected for a particular application. Such data records may include manufacturing data, design data, service data, research data, financial data, and/or any other type of data. Input data 102 may also include training data used to build neural network model 104 and testing data used to test neural network model 104. Training data, i.e., the combination of input data 102 and output data 106, may come from empirical testing or computer simulations.

Neural network model 104 may be any appropriate type of neural network based mathematical model that may be trained to capture interrelationships between input parameters and outputs. Although FIG. 1 shows neural network model 104, other appropriate types of mathematical or computational models may also be used. Once neural network model 104 is trained, neural network model 104 may be used to produce outputs 106 when provided with a set of input parameters (e.g., input data 102). An output of neural network model 104 may have a statistical distribution based on ranges of corresponding input parameters and their respective distributions. Different input parameter values may produce different output values. The ranges of input parameters to produce normal or desired outputs, however, may vary.

A zeta statistic optimization process 108 may be provided to identify desired value ranges (e.g., desired distributions) of input parameters to maximize the probability of obtaining a desired output or outputs. Zeta statistic may refer to a mathematic concept reflecting a relationship between input parameters, their value ranges, and desired outputs. Zeta statistic may be represented as $$\zeta = \sum_{1}^{j} \sum_{1}^{i} |S_{ij}| \left(\frac{\sigma_i}{\bar{x}_i}\right)\left(\frac{\bar{x}_j}{\sigma_j}\right), \quad (1)$$

where $\bar{x}_i$ represents the mean or expected value of an ith input; $\bar{x}_j$ represents the mean or expected value of a jth output; $\sigma_i$ represents the standard deviation of the ith input; $\sigma_j$ represents the standard deviation of the jth output; and $|S_{ij}|$ represents the partial derivative or sensitivity of the jth output to the ith input. Combinations of desired values of input parameters may be determined based on the zeta statistic calculated and optimized. The zeta statistic $\zeta$ may also be referred to as a process stability metric, the capability for producing consistent output parameter values from highly variable input parameter values. Results of the zeta optimization process may be outputted to other application software programs or may be displayed (optimization output 110). The optimization processes may be performed by one or more computer systems.

Figure 2:
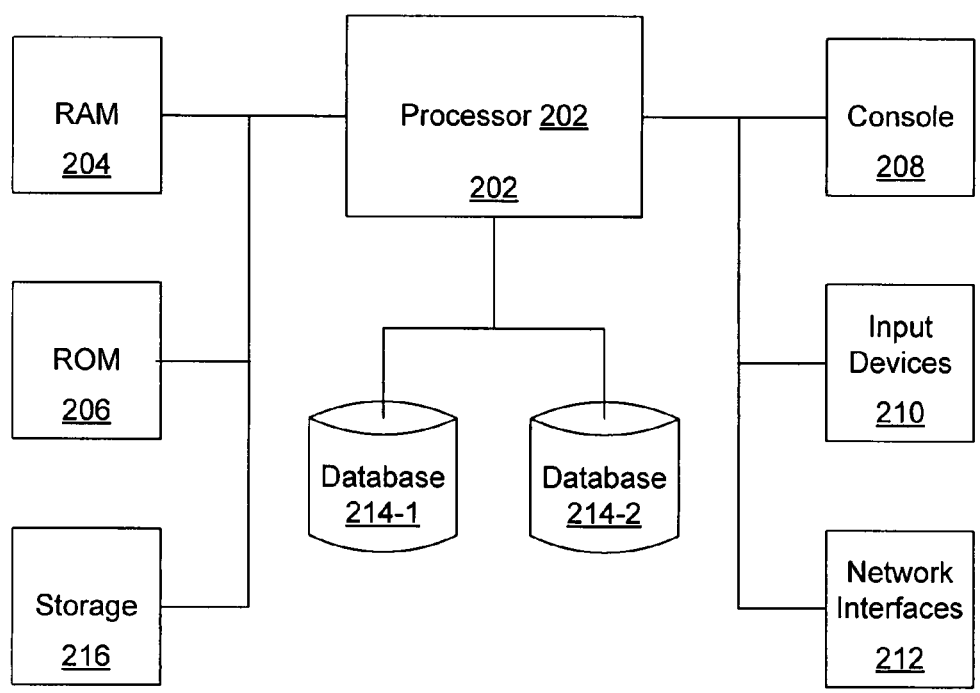
FIG. 2 illustrates a block diagram of a computer system consistent with certain disclosed embodiments.

FIG. 2 shows a functional block diagram of an exemplary computer system 200 configured to perform these processes. As shown in FIG. 2, computer system 200 may include a processor 202, a random access memory (RAM) 204, a read-only memory (ROM) 206, a console 208, input devices 210, network interfaces 212, databases 214-1 and 214-2, and a storage 216. It is understood that the type and number of listed devices are exemplary only and not intended to be limiting. The number of listed devices may be varied and other devices may be added.

Processor 202 may execute sequences of computer program instructions to perform various processes, as explained above. The computer program instructions may be loaded into RAM 204 for execution by processor 202 from a read-only memory (ROM). Storage 216 may be any appropriate type of mass storage provided to store any type of information processor 202 may access to perform the processes. For example, storage 216 may include one or more hard disk devices, optical disk devices, floppy disk devices, or other storage devices to provide storage space.

Console 208 may provide a graphic user interface (GUI) to display information to users of computer system 200, such as outputs 106. Console 208 may include any appropriate type of computer display devices or computer monitors. Input devices 210 may be provided for users to input information into computer system 200. Input devices 210 may include a keyboard, a mouse, or other optical or wireless computer input devices. Further, network interfaces 212 may provide communication connections such that computer system 200 may be accessed remotely through computer networks.

Databases 214-1 and 214-2 may contain model data and any information related to data records under analysis, such as training and testing data. Databases 214-1 and 214-2 may also include analysis tools for analyzing the information in the databases. Processor 202 may also use databases 214-1 and 214-2 to determine correlation between parameters.

Figure 3:
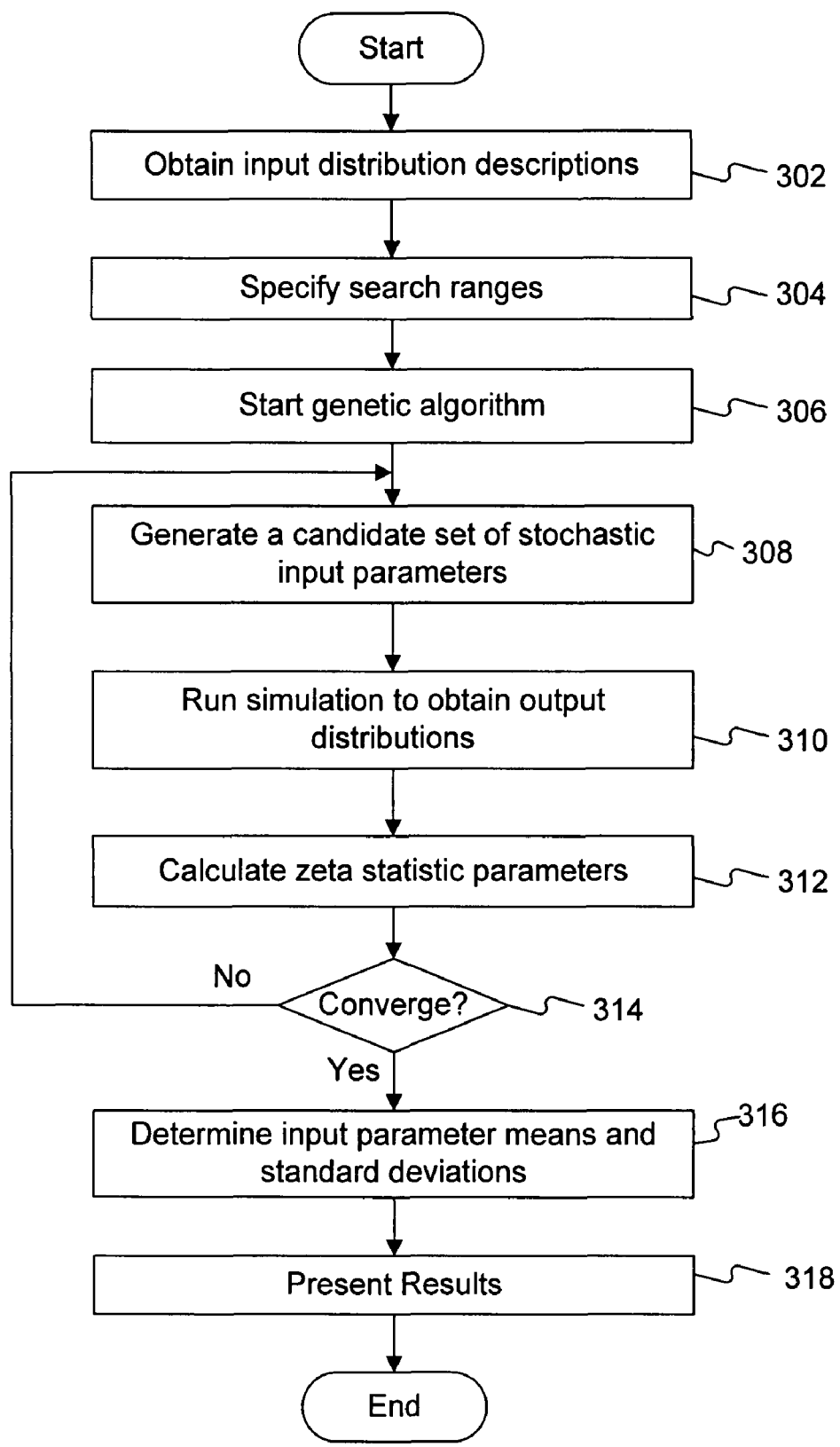
FIG. 3 illustrates a flowchart of an exemplary zeta optimization process performed by a disclosed computer system.

As explained above, computer system 200 may perform process 108 to determine desired distributions (e.g., means, standard deviations, etc.) of input parameters. FIG. 3 shows an exemplary flowchart of a zeta optimization process included in process 108 performed by computer system 200 and, more specifically, by processor 202 of computer system 200.

As shown in FIG. 3, processor 202 may obtain input distribution descriptions of stochastic input parameters (step 302). A distribution description of an input parameter may include a normal value for the input parameter and a tolerance range. Within the tolerance range about the normal value, the input parameter may be considered normal. Outside this range, the input parameter may be considered abnormal. Input parameters may include any appropriate type of input parameter corresponding to a particular application, such as a manufacture, service, financial, and/or research project. Normal input parameters may refer to dimensional or functional characteristic data associated with a product manufactured within tolerance, performance characteristic data of a service process performed within tolerance, and/or other characteristic data of any other products and processes. Normal input parameters may also include characteristic data associated with design processes. Abnormal input parameters may refer to any characteristic data that may represent characteristics of products, processes, etc., made or performed outside of a desired tolerance. It may be desirable to avoid abnormal input parameters.

The normal values and ranges of tolerance may be determined based on deviation from target values, discreteness of events, allowable discrepancies, and/or whether the data is in distribution tails or in a certain range of the distribution. In certain embodiments, the normal values and ranges of tolerance may also be determined based on experts' opinion or empirical data in a corresponding technical field. Alternatively, the normal value and range of tolerance of an individual input parameter may be determined by outputs 106. For example, an input parameter may be considered as normal if outputs 106 based on the input parameter are in a normal range.

After obtaining input parameter distribution description (step 302), processor 202 may specify search ranges for the input parameters (step 304). Search ranges may be specified as the normal values and tolerance ranges of individual input parameters. In certain embodiments, search ranges may also include values outside the normal tolerance ranges if there is indication that such out-of-range values may still produce normal outputs when combined with appropriate values of other input parameters.

Processor 202 may setup and start a genetic algorithm as part of the zeta optimization process (step 306). The genetic algorithm may be any appropriate type of genetic algorithm that may be used to find possible optimized solutions based on the principles of adopting evolutionary biology to computer science. When applying a genetic algorithm to search a desired set of input parameters, the input parameters may be represented by a parameter list used to drive an evaluation procedure of the genetic algorithm. The parameter list may be called a chromosome or a genome. Chromosomes or genomes may be implemented as strings of data and/or instructions.

Initially, one or several such parameter lists or chromosomes may be generated to create a population. A population may be a collection of a certain number of chromosomes. The chromosomes in the population may be evaluated based on a fitness function or a goal function, and a value of suitability or fitness may be returned by the fitness function or the goal function. The population may then be sorted, with those having better suitability more highly ranked.

The genetic algorithm may generate a second population from the sorted population by using genetic operators, such as, for example, selection, crossover (or reproduction), and mutation. During selection, chromosomes in the population with fitness values below a predetermined threshold may be deleted. Selection methods, such as roulette wheel selection and/or tournament selection, may also be used. After selection, a reproduction operation may be performed upon the selected chromosomes. Two selected chromosomes may be crossed over along a randomly selected crossover point. Two new child chromosomes may then be created and added to the population. The reproduction operation may be continued until the population size is restored. Once the population size is restored, mutation may be selectively performed on the population. Mutation may be performed on a randomly selected chromosome by, for example, randomly altering bits in the chromosome data structure.

Selection, reproduction, and mutation may result in a second generation population having chromosomes that are different from the initial generation. The average degree of fitness may be increased by this procedure for the second generation, since better fitted chromosomes from the first generation may be selected. This entire process may be repeated for any desired number of generations until the genetic algorithm converges. Convergence may be determined if the rate of improvement between successive iterations of the genetic algorithm falls below a predetermined threshold.

When setting up the genetic algorithm (step 306), processor 202 may also set a goal function for the genetic algorithm. As explained above, the goal function may be used by the genetic algorithm to evaluate fitness of a particular set of input parameters. For example, the goal function may include maximizing the zeta statistic based on the particular set of input parameters. A larger zeta statistic may allow a larger dispersion for these input parameters, thus, having a higher fitness, while still maintaining normal outputs 106. A goal function to maximize the zeta statistic may cause the genetic algorithm to choose a set of input parameters that have desired dispersions or distributions simultaneously.

After setting up and starting the genetic algorithm, processor 202 may cause the genetic algorithm to generate a candidate set of input parameters as an initial population of the genetic algorithm (step 308). The candidate set may be generated based on the search ranges determined in step 304. The genetic algorithm may also choose the candidate set based on user inputs. Alternatively, the genetic algorithm may generate the candidate set based on correlations between input parameters. For example, in a particular application, the value of one input parameter may depend on one or more other input parameters (e.g., power consumption may depend on fuel efficiency, etc.). Further, the genetic algorithm may also randomly generate the candidate set of input parameters as the initial population of the genetic algorithm.

Figure 4:
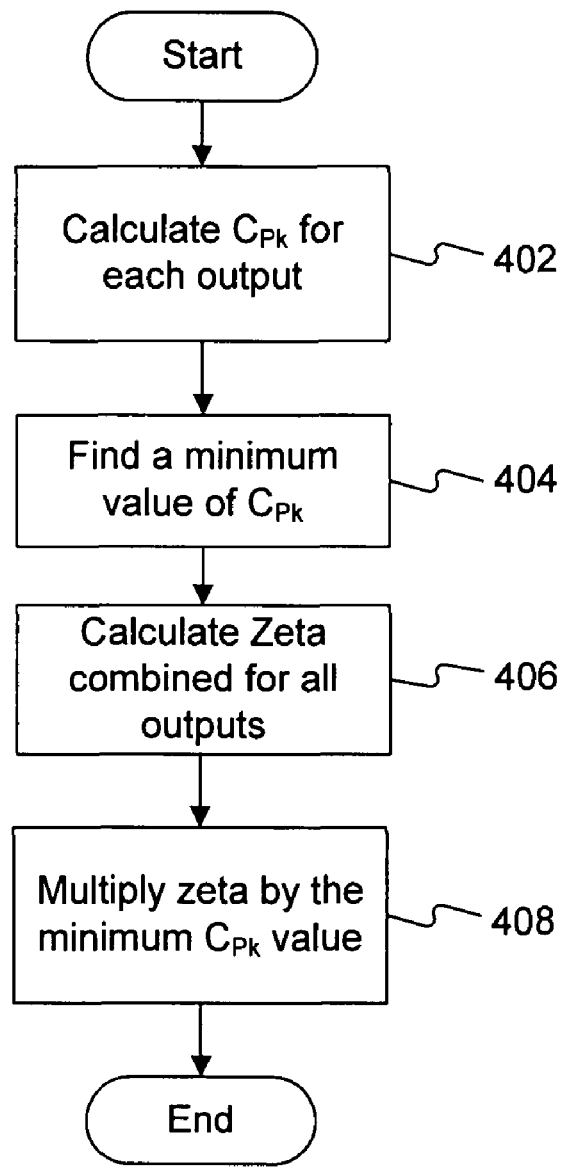
FIG. 4 illustrates a flowchart of an exemplary zeta statistic parameter calculation process consistent with certain disclosed embodiments.

Once the candidate set of stochastic input parameters are generated (step 308), processor 202 may run a simulation operation to obtain output distributions (step 310). For example, processor 202 may provide the candidate set of input parameters to neural network model 104, which may generate a corresponding set of outputs 106. Processor 202 may then derive the output distribution based on the set of outputs. Further, processor 202 may calculate various zeta statistic parameters (step 312). FIG. 4 shows a calculation process for calculating the zeta statistic parameters.

As shown in FIG. 4, processor 202 may calculate the values of variable $C_{pk}$ for individual outputs (step 402). The variable $C_{pk}$ may refer to a compliance probability of an output and may be calculated as $$C_{pk} = \min\left\{\frac{\bar{x} - LCL}{3\sigma}, \frac{UCL - \bar{x}}{3\sigma}\right\}, \quad (2)$$

where LCL is a lower control limit, UCL is a upper control limit, $\bar{x}$ is mean value of output x, and $3\sigma$ is a standard deviation of output x. The lower control limit and the upper control limit may be provided to set a normal range for the output x. A smaller $C_{pk}$ may indicate less compliance of the output, while a larger $C_{pk}$ may indicate better compliance.

Once the values of variable $C_{pk}$ for all outputs are calculated, processor 202 may find a minimum value of $C_{pk}$ as $C_{pk,worst}$ (step 404). Concurrently, processor 202 may also calculate zeta value ζ as combined for all outputs (step 406). The zeta value ζ may be calculated according to equation (1). During these calculations, $\bar{x}_i$ and $\sigma_i$ may be obtained by analyzing the candidate set of input parameters, and $\bar{x}_j$ and $\sigma_j$ may be obtained by analyzing the outputs of the simulation. Further, $|S_{ij}|$ may be extracted from the trained neural network as an indication of the impact of ith input on the jth output. After calculating the zeta value ζ, processor 202 may further multiply the zeta value ζ by the minimum $C_{pk}$ value, $C_{pk,worst}$, (step 408) and continue the genetic algorithm process.

Returning to FIG. 3, processor 202 may determine whether the genetic algorithm converges on the selected subset of parameters (step 314). As explained above, processor 202 may set a goal function during initialization of the genetic algorithm to evaluate chromosomes or parameter lists of the genetic algorithm. In certain embodiments, the goal function set by processor 202 may be to maximize the product of ζ and $C_{pk,worst}$. If the product of ζ and $C_{pk,worst}$ is above a predetermined threshold, the goal function may be satisfied. The value of calculated product of ζ and $C_{pk,worst}$ may also be returned to the genetic algorithm to evaluate an improvement during each generations. For example, the value of product of ζ and $C_{pk,worst}$ may be compared with the value of product of ζ and $C_{pk,worst}$ of previous iteration of the genetic algorithm to decide whether an improvement is made (e.g., a larger value) and to determine an improvement rate. Processor 202 may determine whether the genetic algorithm converges based on the goal function and a predetermined improvement rate threshold. For example, the rate threshold may be set at approximately between 0.1% to 1% depending on types of applications.

If the genetic algorithm does not converge on a particular candidate set of input parameters (step 314; no), the genetic algorithm may proceed to create a next generation of chromosomes, as explained above. The zeta optimization process may go to step 308. The genetic algorithm may create a new candidate set of input parameters for the next iteration of the genetic algorithm (step 308). The genetic algorithm may recalculate the zeta statistic parameters based on the newly created candidate set of input parameters or chromosomes (steps 310 and 312).

On the other hand, if the genetic algorithm converges on a particular candidate set of input parameters (step 314; yes), processor 202 may determine that an optimized input parameter set has been found. Processor 202 may further determine mean and standard deviations of input parameters based on the optimized input parameter set (316). That is, processor 202 may determine desired distributions (e.g., mean and standard deviations) of input parameters based on the desired or optimized input parameter set.

Once the desired distributions are determined, processor 202 may define a valid input space that may include any input parameter within the desired distributions. Additionally, processor 202 may create a database to store information generated during the zeta optimization process. For example, processor 202 may store data records of the input parameters and output parameters and/or impact relationships between input parameters and outputs.

In one embodiment, statistical distributions of certain input parameters may be impossible or impractical to control. For example, an input parameter may be associated with a physical attribute of a device, such as a dimensional attribute of an engine part, or the input parameter may be associated with a constant variable within virtual sensor process models, etc. These input parameters may be used in the zeta statistic calculations to search or identify desired distributions for other input parameters corresponding to constant values and/or statistical distributions of these input parameters.

Further, optionally, more than one neural network models may be established. Multiple established neural network models may be simulated by using any appropriate type of simulation method, such as statistical simulation. Output parameters based on simulation of these multiple neural network models may be compared to select a best-fit neural network model based on predetermined criteria, such as smallest variance, etc. The selected best-fit neural network model 104 may be deployed in applications.

Further, processor 202 may process and present stochastic simulation results of the zeta optimization process (step 318). Processor 202 may process and interpret the results of the zeta optimization process by any appropriate algorithm. For example, processor 202 may use any appropriate tree-related method, such as Chi-square automatic interaction detection (CHAID), exhaustive CHAID, classification & regression trees (C&RT), etc., and/or rule-induction related methods based on data obtained during the optimization process.

If the data indicates that the value of a particular input parameter varies significantly within the search range with little change to the values of the output parameters, processor 202 may identify the particular input parameter as one having only a minor effect on the output. An impact level or significance level may be predetermined by processor 202 to determine whether the effect is minor (i.e., below the impact level). Processor 202 may also output such information to users or other application software programs. For instance, in a design process, such information may be used to increase design tolerance of a particular design parameter. In a manufacture process, such information may also be used to reduce cost of a particular part.

Figure 5:
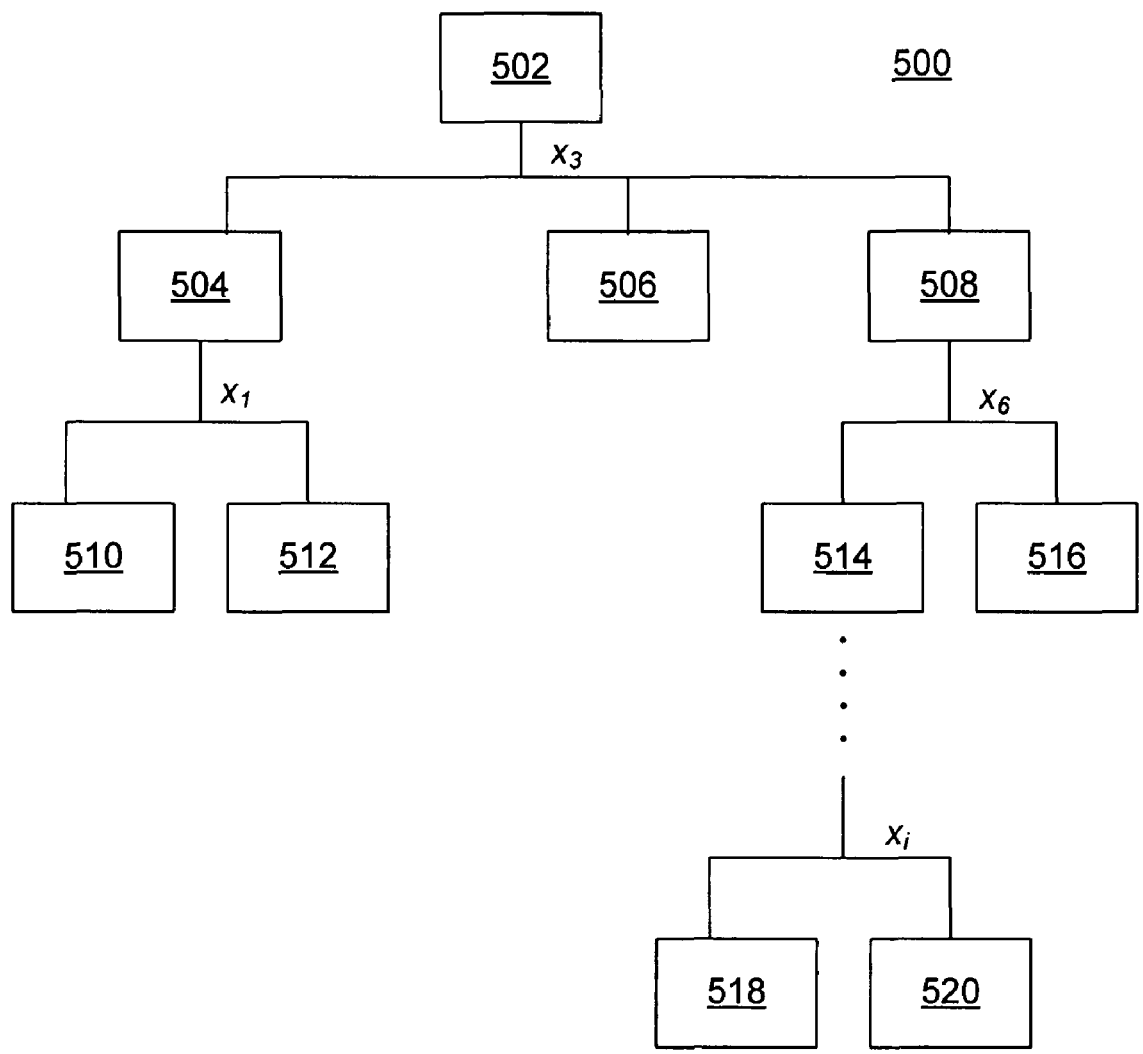
FIG. 5 illustrates an exemplary tree diagram consistent with certain disclosed embodiments.

In certain embodiments, processor 202 may interpret the results based on a CHAID method. CHAID, or Chi-square automatic interaction detection, as used herein, may refer to a classification tree technique that evaluates interactions among a plurality of predictors and/or displays the results in a tree diagram. FIG. 5 shows an exemplary block diagram of CHAID interpretation of the results of the zeta optimization. For illustrative purposes, the results of the zeta optimization may include values of the input parameters $x_1, x_2, x_3, \ldots, x_i$ and output parameters $y_1, y_2, y_3, \ldots, y_j$, where i and j are integers representing total numbers of the input parameters and output parameters, respectively. Although only a CHAID method is described below, other methods, such as exhaustive CHAID, C&RT, etc., may also be used.

As shown in FIG. 5, a tree diagram 500 to be generated via CHAID may include a trunk node 502; first layer nodes 504, 506, and 508; second layer node 510, 512, 514, and 516; other layer nodes (not shown); and terminal nodes 518 and 520. Further, tree diagram 500 may include multiple split points $x_3, x_1, x_6, \ldots, x_i$ (as taken from input parameters $x_1, x_2, x_3, \ldots, x_i$). The number of nodes, layers, and split points are shown for exemplary purposes only, other configurations may also be used.

Trunk node 502 may represent the results database, i.e., data records collected during the zeta optimization process including values of both input parameters and output parameters. Processor 202 may create trunk node 502 based on the data records from the zeta optimization process as explained above. Processor 202 may then create first layer nodes 504, 506, and 508. A layer node, or branch node, may represent certain data records of the results database under limitations set by its parent nodes.

Processor 202 may create first layer nodes 504, 506, and 508 based on values of the strongest predictor of the output parameters. A predictor, as used herein, may refer to a variable, corresponding to an input parameter, that may represent certain interrelationships between the input parameter and output parameters and may also reflect a statistically significant discrimination among different values of the output parameters. A predictor may be categorical, i.e., with discrete values, or continuous, i.e., with continuous values. Processor 202 may create a series of predictors for creating layer nodes of tree diagram 500. For continuous predictors, processor 202 may optionally convert the continuous predictors into categorical predictors by dividing the respective continuous distributions of the input parameters into a number of categories with an approximately equal number of observations.

After preparing a series of predictors, processor 202 may start a CHAID algorithm to automatically determine how to group or merge the values of the predictors into a manageable number of categories (e.g., 2, 3, 4, etc.). Processor 202 may determine possible interactions between the output parameters and the predictors. To infer from interactions in the data records possible dependencies between the input parameters and the output parameters, processor 202 may perform Chi-squared tests of independence within the CHAID algorithm. The test statistic of the Chi-squared test may cumulate the (standardized) squared deviations between observed and expected frequencies of output parameters fit within a category of the predictor. Further, large values of the test statistic may indicate more interactions between the analyzed parameters. For the categories with a small amount of or no interactions, processor 202 may merge these categories into a single group, or merge these categories with the category having a large amount of interactions.

Further, processor 202 may calculate p-value for all the predictors, each corresponding to an input parameter, to determine a split point. The p-value, as used herein, may refer to an error probability defined by a significance level that may represent a statistically significant interaction between a particular input parameter and the output parameters. Processor 202 may choose the predictor, or the corresponding input parameter, with the smallest p-value, i.e., the predictor that may yield the most significant split as the split point.

For example, if the predictor corresponding to $x_3$ has the smallest p-value, processor 202 may select $x_3$ as the split point for the first layer. Further, processor 202 may also determine first layer nodes 504, 506, and 508, each corresponding to a different range of the predictor of $x_3$. The total number of nodes, i.e., 3, is used for exemplary purposes only, and may be set to any appropriate number based on the CHAID algorithm, which may merge different ranges or categories into a single range or category, thus change the number of layer nodes.

Processor 202 may repeat the above process to further determine next significant split or splits and to create further layer nodes based on the Chi-square test and the p-values. For example, processor 202 may determine split point $x_1$, and $x_6$, and may create second layer nodes 510 and 512, corresponding to $x_1$, and second layer nodes 514 and 516, corresponding to $x_6$.

If processor 202 determines that the smallest p-value for any predictor is greater than a predetermined threshold value, then no further split will be performed, and a respective node may be referred to as a terminal node or leaf node. For example, after split point $x_j$, processor 202 may determine that layer nodes 518 and 520 are terminal nodes. If processor 202 determines that no further split needs to be performed on any branch node, processor 202 may complete the above tree building process.

Processor 202 may also interpret tree diagram 500 based on split points and layer nodes. Processor 202 may interpret and identify input parameters that have significant impact on output parameters based on split points corresponding to the input parameters. For example, processor 202 may interpret that input parameter $x_3$ (the first split point) may be the most significant factor to be considered during a design process related to the output parameters, because changes made to input parameter $x_3$ would have the most significant effect on the output parameters. That is, $x_3$ may have the highest significance level for interacting with the output parameters.

Processor 202 may also interpret significance of other input parameters in a sequence determined by tree diagram 500. For example, processor 202 may determine that input parameters $x_1$ and $x_6$ may have the second most significant effect on the output parameters, and that input parameter $x_j$ may have the least significant effect on the output parameters. Further, if any input parameter is not included in split points of tree diagram 500, processor 202 may determine that the omitted input parameter may have little or no effect on the output parameters.

Processor 202 may further use such information to guide the zeta optimization process in a particular direction based on the impact probability or significance level, such as when a new candidate set of input parameters is generated. For example, the optimization process may focus on the input parameters that have significant impact on output parameters.

Additionally or optionally, processor 202 may also determine significant ranges of input parameters based on the layer nodes. For example, processor 202 may determine that ranges represented by layer nodes 504 and 508 are more significant than the range represented by layer node 506 in that more subsequent layer nodes follow layer nodes 504 and 508.

Processor 202 may also present the interpretation results. For example, processor 202 may output the results to other application software programs or, alternatively, display the results as graphs on console 208. Further, processor 202 may display the results in any appropriate format, such as a tree diagram as shown in FIG. 5, or a table listing input parameter, output parameters, split points, and categories in certain sequences.

INDUSTRIAL APPLICABILITY

The disclosed zeta statistic process methods and systems provide a desired solution for effectively identifying input target settings and allowed dispersions in one optimization routine. The disclosed methods and systems may also be used to efficiently determine areas where input dispersion can be increased without significant computational time. The disclosed methods and systems may also be used to guide outputs of mathematical or physical models to stability, where outputs are relatively insensitive to variations in the input domain. Performance of other statistical or artificial intelligence modeling tools may be significantly improved when incorporating the disclosed methods and systems.

Certain advantages may be illustrated by, for example, designing and manufacturing an engine component using the disclosed methods and systems. The engine components may be assembled from three parts. Under conventional practice, all three parts may be designed and manufactured with certain precision requirements (e.g., a tolerance range). If the final engine component assembled does not meet quality requirements, often the precision requirements for all three parts may be increased until these parts can produce a good quality component. On the other hand, the disclosed methods and systems may be able to simultaneously find desired distributions or tolerance ranges of the three parts to save time and cost. The disclosed methods and systems may also find, for example, one of the three parts that has only minor effect on the component quality. The precision requirement for the one with minor effect may be lowered to further save manufacturing cost.

The disclosed zeta statistic process methods and systems may also provide a more effective solution to process modeling containing competitive optimization requirements. Competitive optimization may involve finding the desired input parameters for each output parameter independently, then performing one final optimization to unify the input process settings while staying as close as possible to the best possible outcome found previously. The disclosed zeta statistic process methods and systems may overcome two potential risks of the competitive optimization (e.g., relying on sub-optimization to create a reference for future optimizations, difficult or impractical trade off between two equally balanced courses of action, and unstable target values with respect to input process variation) by simultaneously optimizing a probabilistic model of competing requirements on input parameters. Further, the disclosed methods and systems may simultaneously find desired distributions of input parameters without prior domain knowledge and may also find effects of variations between input parameters and output parameters.

Further, the disclosed methods and systems may provide desired interpretation and presentation of optimization results based on optimization data. By using the data records collected during the optimization process, more accurate and more representative data may be obtained than using conventional techniques, which often use original data records. Moreover, such presentation may provide a user with a visual view of dependencies and other interrelationships among input parameters and/or between input parameters and output parameters.

Other embodiments, features, aspects, and principles of the disclosed exemplary systems will be apparent to those skilled in the art and may be implemented in various environments and systems.

What is claimed is:

1. A computer-implemented method for model optimization, comprising:
    obtaining respective distribution descriptions of a plurality of input parameters to a model, the model indicating interrelationships between the input parameters and one or more output parameters of a system design;

specifying respective search ranges for the plurality of input parameters;
simulating the model to determine a desired set of input parameters within the search ranges based on a zeta statistic of the model;
determining respective desired distributions of the input parameters based on the desired set of input parameters;
determining significance levels of the input parameters in interacting with the output parameters based on the simulation and on the desired distributions of the input parameters, including:
  obtaining data records of the input parameters and the output parameters based on the simulation of the model;
  building a multiple layer tree diagram based on the data records, the tree diagram including a trunk node representing the data records, a plurality of split points, and a plurality of layer nodes, wherein each split point corresponds to one of the input parameters and the layer nodes are coupled to the trunk node via the split points; and
  determining the significance levels of the input parameters based on the order of the split points in relation to the trunk node; and
identifying, based on the significance levels of the input parameters, a parameter of the system design that has a threshold design tolerance;
presenting the determined significance levels, including:
  displaying a graphical representation of the tree diagram to a user via a display device; and
  outputting, via the graphical representation, a representation of the identified parameter of the system design that has the threshold design tolerance.

2. The computer-implemented method according to claim 1, wherein the zeta statistic $\zeta$ is represented by:

$$\zeta = \sum_{1}^{j} \sum_{1}^{i} |S_{ij}| \left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma_j$ represents a standard deviation of the jth output; and $|S_{ij}|$ represents sensitivity of the jth output to the ith input.

3. The computer-implemented method according to claim 1, wherein building the tree diagram includes applying a Chi-square automatic interaction detection (CHAID) algorithm based on the data records.

4. The computer-implemented method according to claim 3, further including:
preparing a set of predictors for each input parameters;
performing a Chi-squared test to merge the set of predictors into a desired number of predictors;
calculating a p-value for the merged predictors; and
choosing an input parameter corresponding to a merged predictor with the smallest p-value as the highest level split point of the tree diagram.

5. The computer-implemented method according to claim 1, wherein simulating includes:
starting a genetic algorithm;
generating a candidate set of values of the input parameters;
providing the candidate set of values of the input parameters to the model to generate values of the one or more output parameters;
obtaining output parameter distributions based on the one or more output parameters;
calculating respective compliance probabilities of the one or more outputs; and
calculating a zeta statistic of the model.

6. The computer-implemented method according to claim 5, further including:
determining a minimum compliant probability from the respective compliant probabilities of the one or more output parameters; and
setting a goal function of the genetic algorithm to maximize a product of the zeta statistic and the minimum compliant probability, the goal function being set prior to starting the genetic algorithm.

7. The computer-implemented method according to claim 6, wherein the simulating further includes:
determining whether the genetic algorithm converges;
identifying the candidate set of input parameters as the desired set of input parameters if the genetic algorithm converges;
choosing a different candidate set of input parameters if the genetic algorithm does not converge; and
repeating the step of simulating to identify a desired set of input parameters based on the different candidate set of input parameters.

8. The computer-implemented method according to claim 7, further including:
selectively modifying the search ranges of the input parameters used in the simulation based on the determined significance levels of the input parameters.

9. A computer system, comprising:
a display device;
at least one input device; and
a processor configured to:
  obtain respective distribution descriptions of a plurality of input parameters to a model, the model indicating interrelationships between the input parameters and one or more output parameters of a system design;
  specify respective search ranges for the plurality of input parameters;
  simulate the model to determine a desired set of input parameters within the search ranges based on a zeta statistic of the model;
  determine respective desired distributions of the input parameters based on the desired set of input parameters;
  determine significance levels of the input parameters in interacting with the output parameters based on the simulation and on the desired distribution of the input parameters, including:
    obtaining data records of the input parameters and the output parameters based on the simulation of the model;
    building a multiple layer tree diagram based on the data records, the tree diagram including a trunk node representing the data records, a plurality of split points, and a plurality of layer nodes, wherein each split point corresponds to one of the input parameters and the layer nodes are coupled to the trunk node via the split points; and
    determining the significance levels of the input parameters based on the order of the split points in relation to the trunk node;
  identify an input parameter having a significance level below a significance threshold corresponding to a threshold design tolerance; and present, via a graphical user interface on the display device, an indication of the identified input parameter with the significance level below the threshold significance corresponding to the threshold design tolerance.

10. The computer system according to claim 9, wherein the zeta statistic $\zeta$ is represented by:

$$\zeta = \sum_{1}^{j}\sum_{1}^{i}|S_{ij}|\left(\frac{\sigma_i}{\bar{x}_i}\right)\left(\frac{\bar{x}_j}{\sigma_j}\right),$$

provided that $\bar{x}_i$ represents a mean of an ith input; $\bar{x}_j$ represents a mean of a jth output; $\sigma_i$ represents a standard deviation of the ith input; $\sigma^j$ represents a standard deviation of the jth output; and $|S_{ij}|$ represents sensitivity of the jth output to the ith input.

11. The computer system according to claim 9, wherein the processor is configured to build the tree diagram by applying a Chi-square automatic interaction detection (CHAID) algorithm based on the data records.

12. The computer system according to claim 11, wherein the processor is further configured to:
prepare a set of predictors for each input parameters;
perform a Chi-squared test to merge the set of predictors into desired number of predictors;
calculate a p-value for all merged predictors; and
choose input parameter corresponding to a merged predictor with the smallest p-value as the highest level split point of the tree diagram.

13. The computer system according to claim 9, wherein, to simulate the model, the processor is configured to:
start a genetic algorithm;
generate a candidate set of values of the input parameters;
provide the candidate set of values of the input parameters to the model to generate values of the one or more output parameters;
obtain output distributions based on the one or more output parameters;
calculate respective compliance probabilities of the one or more output parameters; and
calculate a zeta statistic of the model.

14. The computer system according to claim 13, the processor is further configured to:
determine a minimum compliant probability from the respective compliant probabilities of the one or more output parameters; and
set a goal function of the genetic algorithm to maximize a product of the zeta statistic and the minimum compliant probability, the goal function being set prior to starting the genetic algorithm.

15. The computer system according to claim 14, wherein, to simulate the model, the processor is further configured to:
determine whether the genetic algorithm converges;
identify the candidate set of input parameters as the desired set of input parameters if the genetic algorithm converges;
choose a different candidate set of input parameters if the genetic algorithm does not converge; and
repeat the step of simulating to identify a desired set of input parameters based on the different candidate set of input parameters.

16. The computer system according to claim 15, wherein the processor is further configured to:
selectively modify the search ranges of the input parameters used in the simulation based on the determined significance levels of the input parameters.

17. A computer-implemented method for model optimization, comprising:
obtaining respective distribution descriptions of a plurality of input parameters to a model, the model indicating interrelationships between the input parameters and one or more output parameters of a system design;
specifying respective search ranges for the plurality of input parameters;
simulating the model to determine a desired set of input parameters within the search ranges based on a zeta statistic of the model;
determining respective desired distributions of the input parameters based on the desired set of input parameters;
determining significance levels of the input parameters in interacting with the output parameters based on the simulation and on the desired distributions of the input parameters, the determining including:
obtaining data records of the input parameters and the output parameters based on the simulation of the model;
building a multiple layer tree diagram based on the data records, the tree diagram including a trunk node representing the data records, a plurality of split points, and a plurality of layer nodes, wherein each split point corresponds to one of the input parameters and the layer nodes are coupled to the trunk node via the split points; and
determining the significance levels of the input parameters based on the order of the split points in relation to the trunk node;
determining input parameters that have significance levels below a significance threshold;
modifying the search ranges of the input parameters based on the determined significance levels; and
optimizing the model based on the input parameters determined to have significance levels below the significance threshold and on the modified search ranges.

* * * * *